(12) United States Patent
Ramakrishnan et al.

(10) Patent No.: US 9,608,942 B1
(45) Date of Patent: Mar. 28, 2017

(54) DIGITAL DATA PROCESSING METHODS AND APPARATUS FOR THE AUTOMATED GENERATION OF PERSONALIZED DIGITAL CONTENT

(71) Applicant: CQuotient, Inc., Cambridge, MA (US)

(72) Inventors: Vishwamitra S. Ramakrishnan, Belmont, MA (US); Yevgeniy Popkov, Brookline, MA (US)

(73) Assignee: CQuotient, Inc., Cambridge, MA (US)

( * ) Notice: Subject to any disclaimer, the term of this patent is extended or adjusted under 35 U.S.C. 154(b) by 86 days.

(21) Appl. No.: 14/177,618

(22) Filed: Feb. 11, 2014

(51) Int. Cl.
   *G06F 15/16*  (2006.01)
   *H04L 12/58*  (2006.01)

(52) U.S. Cl.
   CPC .............. *H04L 51/04* (2013.01); *H04L 51/16* (2013.01)

(58) Field of Classification Search
   CPC .............. G06Q 30/02; G06Q 30/0241; G06Q 30/0202; G06Q 10/06375; G06N 99/005
   See application file for complete search history.

(56) References Cited

U.S. PATENT DOCUMENTS

| | | | | |
|---|---|---|---|---|
| 2004/0204975 | A1* | 10/2004 | Witting ................. | G06Q 30/02 705/14.41 |
| 2007/0288304 | A1* | 12/2007 | Gutierrez ......... | G06Q 10/06375 705/14.49 |

(Continued)

OTHER PUBLICATIONS

Stochastic Gradient Descent (Logistic Regression and Stochastic Gradient Tranining, Charles Elkan, Jan. 29, 2010, https://web.archive.org/web/20100701234413/http://cseweb.ucsd.edu/~elkan/250B/logreg.pdf.*

(Continued)

*Primary Examiner* — Brian P Whipple
*Assistant Examiner* — Gregory P Tolchinsky
(74) *Attorney, Agent, or Firm* — Nutter McClennen & Fish LLP; David J. Powsner

(57) ABSTRACT

The invention provides, in some aspects, digital data processing methods of generating digital content pieces (e.g., email messages or portions thereof) that are customized in accord with individual recipient behaviors. Such methods include the step of generating and digitally transmitting to a digital data devices of a recipient a digital content piece that (i) has a call to action to which the recipient can respond and (ii) that has a plurality of features selected so as to maximize a probability, $P(b_1, b_2, \ldots, b_M, x_1, x_2, \ldots, x_M)$, that the recipient will respond to that call to action, where that probability is defined by the relation $$P(b_1, b_2, \ldots, b_M, x_1, x_2, \ldots, x_M) = \exp(\Sigma_{j=1,\ldots,M} b_j x_j)/(1+\exp(\Sigma_{j=1,\ldots,M} b_j x_j))$$

Figure 1A:
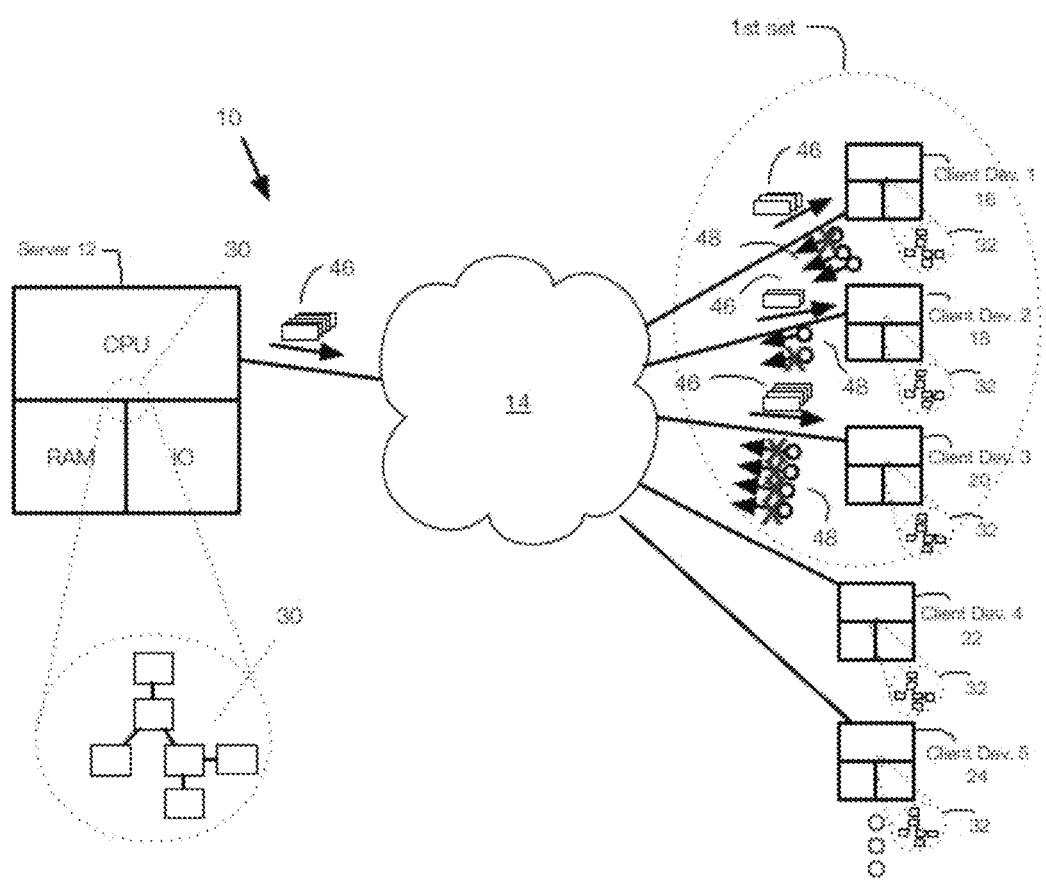

where $x_1, x_2, \ldots, x_M$ are values for each of a plurality, M, of features characterizing the digital content piece and/or the recipient, $b_1, b_2, \ldots, b_M$ are respective coefficients for each of the values $x_1, x_2, \ldots, x_M$.

14 Claims, 3 Drawing Sheets

(56) References Cited

U.S. PATENT DOCUMENTS

| | | | |
|---|---|---|---|
| 2008/0275753 A1* | 11/2008 | Protheroe | G06Q 30/02 705/14.69 |
| 2009/0019122 A1* | 1/2009 | Abhyanker | G06Q 10/107 709/206 |
| 2011/0055000 A1* | 3/2011 | Zhang | G06Q 30/0244 705/14.43 |
| 2012/0150626 A1 | 6/2012 | Zhang et al. | |

OTHER PUBLICATIONS

International Search Report and Written Opinion for Application No. PCT/US2015/014273, mailed Jun. 18, 2015, (11 pages).

* cited by examiner

DIGITAL DATA PROCESSING METHODS AND APPARATUS FOR THE AUTOMATED GENERATION OF PERSONALIZED DIGITAL CONTENT

BACKGROUND OF THE INVENTION

The invention relates to digital data processing and more particularly, by way of non-limiting example, to the automated generation of content that is customized to individual reader behaviors. The invention has application, by way of non-limiting example, in the automated generation of customized emails, e.g., as part of marketing and sales email campaigns.

Email campaigns are the bread and butter of modern digital marketing and are often the most important element of the marketing mix of companies. According to the research firm Forrester, email may drive more than 30% of revenues from repeat customers for retail/e-commerce companies.

Most marketing emails have what is referred to in the industry as "calls to action." These often take the form of clickable buttons or hyperlinks. When the email recipient clicks on these, they are taken to the website of the sender of the email where they can learn more about the news or offerings featured in the email (and make a purchase, in the case of e-commerce). Designing emails so as to maximize the number of click-throughs is therefore an important business objective for email marketers.

Two types of content take up significant real estate in marketing emails, depending on the type of company that send them:

- Product/Offer recommendations (used heavily by retail/e commerce/travel/hospitality companies
- News article recommendations (used heavily by media companies)

These are popular and heavily used by marketers since they represent natural calls to action and because there is a vast and ever-changing set to choose from (enabling the marketer to use them frequently without repeating the same content).

The decisions made by email marketers in choosing this content has a major impact on click-throughs and consequently the revenue performance of the business. So, how do marketers make this decision?

The majority of marketers follow a "top popular items" approach. They select the top selling products and the most recent news stories and feature them in the email. While this is not a bad approach, it has a significant shortcoming. It is one size fits all. It assumes that what makes one recipient click-through is the same factor that will make another recipient to click-through.

In response to this shortcoming, other marketers (a small minority) choose products/news articles that are similar to what each recipient has bought/read in the past. This is vastly superior to the blast the same email to everyone approach but suffers from a very significant issue as well.

Like any digital medium, email has its own idiosyncratic characteristics. The way users interact with email is different from the way they interact with a physical store or newspaper and different from the way they interact with a website.

In view of the foregoing, an object of the invention is to provide improved methods and apparatus for digital data processing and more particularly, by way of non-limiting example, for the automated generation of customized digital content.

A further object of the invention is to provide such methods and apparatus as are suited for the automated generation of customized emails, e.g., as part of marketing and sales email campaigns.

A further related aspect of the invention is to provide such methods and apparatus as are suited for the generation of emails that are personalized for each recipient.

These and other objects of the invention are evident in the drawings and in the discussion that follows.

SUMMARY OF THE INVENTION

The foregoing are among the objects attained by the invention, which provides, in some aspects, digital data processing methods of generating digital content pieces (e.g., email messages or portions thereof) that are customized in accord with individual recipient behaviors. Such methods include the step of generating and digitally transmitting to a digital data device of a recipient a digital content piece that (i) has a call to action to which the recipient can respond and (ii) has a plurality of features selected so as to maximize a probability, $P(b_1,b_2,\ldots,b_M,x_1,x_2,\ldots,x_M)$, that the recipient will respond to that call to action, where that probability is defined by the relation:

$$P(b_1,b_2,\ldots,b_M,x_1,x_2,\ldots,x_M)=\exp(\Sigma_{j=1,\ldots,M}b_jx_j)/(1+\exp(\Sigma_{j=1,\ldots,M}b_jx_j))$$

where $x_1,x_2,\ldots,x_M$ are values for each of a plurality, M, of features characterizing the digital content piece and/or the recipient, $b_1,b_2,\ldots,b_M$ are respective coefficients for each of the values $x_1,x_2,\ldots,x_M$ Further related aspects of the invention provide methods, e.g., as described above, that include generating and transmitting substantially concurrently to digital data devices of a plurality of recipients digital content pieces that each (i) has a call to action to which the respective recipient can respond and (ii) has a plurality of features selected so as to maximize a probability, $P(b_1,b_2,\ldots,b_M,x_1,x_2,\ldots,x_M)$, that the recipient will respond to that call to action, where that probability is defined by the aforementioned relation, and where the digital content pieces generated and transmitted to at least two of the recipients differ from one another.

Other related aspects of the invention provide methods, e.g., as described above, that include generating and transmitting such digital data content pieces substantially concurrently to a first set of over 100 recipients. Still other related aspects of the invention provide methods, e.g., as described above, where the first set comprises over 1000 recipients; over 10,000 recipients; and/or over 100,000 recipients.

Related aspect of the invention provide digital data processing methods, e.g., as described above, wherein the digital content pieces form at least parts of email messages.

Other related aspects of the invention provide methods, e.g., as described above, that include valuing the coefficients $b_1,b_2,\ldots,b_M$ as a function of a dataset representing a history of actual response to calls to action in a plurality, N, of digital content pieces that have one or more of the aforesaid features previously transmitted to digital data devices of a plurality of second set of respective recipients.

In yet other related aspects of the invention, the first set and second sets overlap one another. In still other related aspects of the invention, any of the first and the second sets is a subset of the other set. In still yet other related aspects, the first and second sets do not overlap.

Further related aspects of the invention provide methods, e.g., as described above, that include valuing the coefficients $b_1, b_2, \ldots, b_M$ so as to maximize a likelihood, $L(b_1, b_2, \ldots, b_M, \text{data})$, that predicted responses to calls to action for digital content pieces represented in the dataset match the actual responses represented in the dataset.

Still further related aspects of the invention provide methods, e.g., as described above, where that likelihood is expressed as a function of the relation $$L(b_1, b_2, \ldots, b_M, \text{data}) = \Pi_{i=1, \ldots N; y_i=1} P(b_1, b_2, \ldots, b_M, x_{i1}, x_{i2}, \ldots, x_{iM}) \cdot \Pi_{i=1, \ldots N; y_i=0} (1 - P(b_1, b_2, \ldots, b_M, x_{i1}, x_{i2}, \ldots, x_{iM}))$$

where $\Pi_{i=1, \ldots N; y_i=1} P(b_1, b_2, \ldots, b_M, x_{i1}, x_{i2}, \ldots, x_{iM})$ represents a product of probabilities, $P(b_1, b_2, \ldots, b_M, x_1, x_2, \ldots, x_M)$, for digital content pieces having features of those digital content pieces that were (i) previously transmitted to digital data devices of the plurality of respective recipients in the second set, and (ii) that were opened (or otherwise accessed) by their respective recipients, and (iii) to which the respective call to action was responded to by that recipient.

$\Pi_{i=1, \ldots N; y_i=0} (1 - P(b_1, b_2, \ldots, b_M, x_{i1}, x_{i2}, \ldots, x_{iM}))$ represents a product of probabilities, $P(b_1, b_2, \ldots, b_M, x_1, x_2, \ldots, x_M)$, for digital content pieces having features of those that were (i) previously transmitted to digital data devices of the plurality of respective recipients in the second set, and (ii) that were opened (or otherwise accessed) by there respective recipients, and (iii) to which the respective call to action was not responded to by that recipient.

Yet still further aspects of the invention provide methods, e.g., as described above, that include valuing the coefficients, $b_1, b_2, \ldots, b_M$, to maximize a log of the aforesaid likelihood, $L(b_1, b_2, \ldots, b_M, \text{data})$.

Further aspects of the invention provide methods, e.g., as described above, that includes valuing the coefficients, $b_1, b_2, \ldots, b_M$, by executing a Stochastic Gradient Descent algorithm. In related aspects of the invention, that is characterized by the iterative expression $$b_j^{t+1} = b_j^t - \eta(y_t - P(b_1^t, b_2^t, \ldots, b_N^t, x_{t1}, x_{t2}, \ldots, x_{tM})) x_{t,j}$$

where, $\eta$ is learning rate set by trial and error, $P(b_1^t, b_2^t, \ldots, b_N^t, x_{t1}, x_{t2}, \ldots, x_{tM}))$ is the probability, $P(b_1, b_2, \ldots, b_M, x_1, x_2, \ldots, x_M)$, evaluated using the coefficients $b_j$, for $j=1 \ldots M$ These and other aspects of the invention are evident in the drawings and in the discussion that follows.

BRIEF DESCRIPTION OF THE ILLUSTRATED EMBODIMENT

Figure 1B:
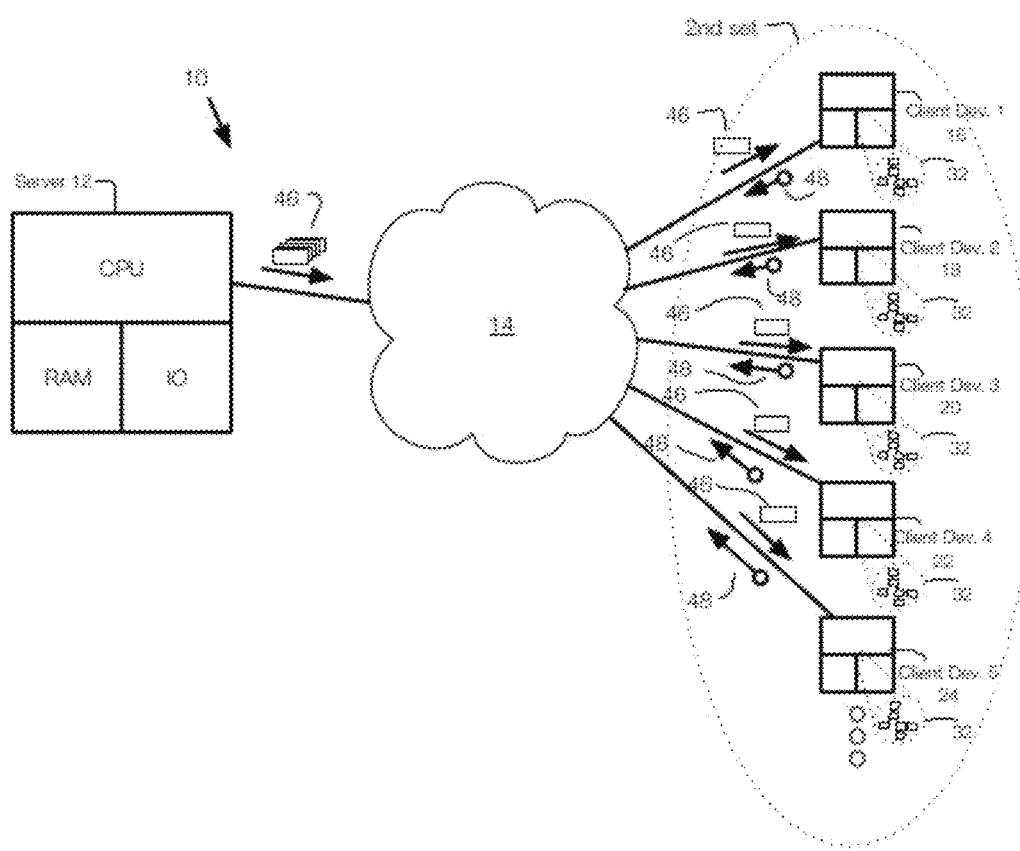
Figure 2:
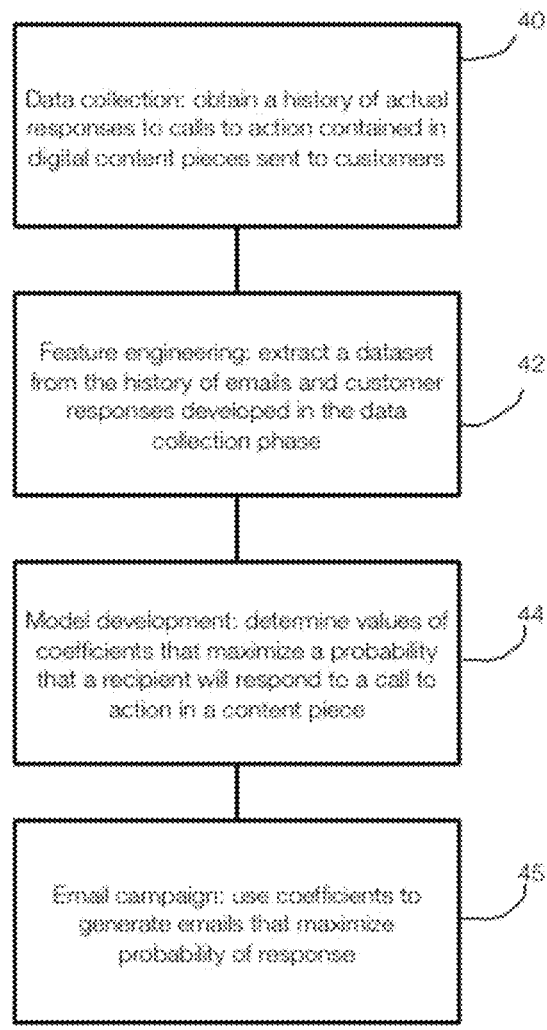

A more complete understanding of the invention may be attained by reference to the drawings, in which:

FIGS. 1A-1B depict a digital data processing system according to one practice of the invention; and FIG. 2 depicts phases executed by a server-based application in a system according to the invention to build and deploy personalized click-through models for digital content, such as emails.

DETAILED DESCRIPTION OF THE ILLUSTRATED EMBODIMENT

Overview

FIGS. 1A-1B depict a digital data processing system 10 according to one practice of the invention for personalizing the automated generation of digital content. That content can constitute email messages and, indeed, the generation of such by companies is focus of the embodiment shown in the drawing and discussed below. However, it will be appreciated that in other embodiments of the invention, the techniques and apparatus described here can be applied to the personalization of other digital content that is associated with calls to action to which recipients can respond, e.g., text messages, multimedia (MMS) messages, and the like. Moreover, it will be appreciate that this may be digital content (e.g., email) generated by entities other than companies, e.g., individuals, governmental organizations, and so forth.

The illustrated system 10 includes a server digital data device 12 that is coupled via network 14 for communication with client digital data devices 16-24.

The digital data devices 12 and 16-24 comprise conventional desktop computers, workstations, minicomputers, laptop computers, tablet computers, PDAs or other digital data devices of the type that are commercially available in the marketplace, all as adapted in accord with the teachings hereof. Each comprises a central processing (CPU), memory (RAM), and input/output (IO) subsections that are of the type conventional in the art and that are configured in accord with the teachings hereof to execute an application 30 (in the case of device 12) and applications 32 (in the case of devices 16-24), all programmed utilizing conventional software engineering techniques to perform the functions attributed herein to those applications and, more generally, to the respective devices 12 and 16-24 herein. The devices 12, 16-24 may be of the same type, though, more typically, constitute a heterogeneous set of devices.

Devices 12 and 16-24 (and, more particularly, for example, their respective central processing (CPU), memory (RAM), and input/output (IO) subsections) are configured to execute operating systems, email, text messaging, web browser and/or other applications and functions (regardless of whether software-based) all of the conventional type known in the art as adapted in accord with the teachings hereof. Applications 30 and 32 cooperate therewith (e.g., with the email, text message, web browser and other functionality executing on the respective devices 12 and 16-24) to exchange digital content—and, specifically, for example, in the illustrated embodiment, email messages—and responses to calls to action contained therein, all consistent with the teachings hereof.

Although only a single server digital data device 12 is depicted and described here, it will be appreciated that other embodiments may utilize a greater number of these devices, homogeneous, heterogeneous or otherwise, networked or otherwise, to perform the functions ascribed hereto to application 30 and/or digital data processor 12. Likewise, although several client digital data devices 16-24 are shown, it will be appreciated that other embodiments may utilize a greater or lesser number of these devices, homogeneous, heterogeneous or otherwise, running applications 32 that are, themselves, homogeneous, heterogeneous or otherwise.

Network 14 comprises one or more networks suitable for supporting communications between server 12 and data devices 16-24. The network comprises one or more arrangements of the type known in the art, e.g., local area networks (LANs), wide area networks (WANs), metropolitan area networks (MANs), and or Internet(s).

Overview

As noted above, email has its own, idiosyncratic characteristics. The way users interact with email is different from the way they interact with, for example, a website. When a user arrives at a website, they have intent, i.e., they have certain goals in mind. For example, if they come to the site with the goal of buying a sweater, they will search for sweaters, click on sweater product images etc.

In contrast, when a user opens an email and sees a sweater image, the factors that determine whether or not she will click on the sweater image or otherwise respond to the call to action (e.g., by clicking on a "buy now," "reserve yours today," "tell me more," etc., button, link or other widget) are very different. These factors may include her previous sweater purchases with the company that sent the email but may also involve aspects of product imagery. Perhaps she will not click on black-and-white images even for products she likes. Perhaps she is more likely to click on product images that are modeled by a real person as opposed to being shown arranged on a table. Perhaps the presence of more expensive products nearby makes her click through less expensive options.

The inventors have realized that the factors that drive clickability of a piece of email content (and, more generally, that drive responses to calls to action of digital content pieces) may include, inter alia,

- the various physical aspects of that content, e.g., black-and-white vs. color image, size of image, presence of model
- the email recipients historical interactions with that company in general and the specific types of content featured in the email
- the interactions between the two sets of factors above (e.g., a user may find black-and-white images of basics like socks eminently clickable, but may not click on black-and-white images of fashion sweaters)

And, from this, the inventors have realized that an effective approach to personalizing the automated generation of email can incorporate data on every customer (their historical purchases or readings, web site visits, email behavior and so on), the various aspects of the contents available for inclusion in the email, and identify the particular combination of factors for each individual that would make him/her click through the email. In short, the approach should be personalized. Such an approach can, for example, include the generation of digital content pieces that are customized in accord with individual recipient behaviors, where each such digital content piece (i) has a call to action to which the recipient can respond and (ii) has a plurality, M, of features selected so as to maximize a probability that the recipient will respond to that call to action, which features take into account that recipient's characteristics, including at least that recipient's responses to one or more calls to action of one or more prior digital content pieces.

Content Pieces, Features and Calls to Action

In the discussion that follows vis-a-vis the illustrated embodiment, a digital content piece (or, more simply, a content piece) is an email message or portion thereof that includes content such as an image(s), video(s) and/or text and that is associated with a call to action. A single email message may include more than one content piece. In other embodiment, a content piece may comprise the whole or portion of a message generated and transmitted via another protocol and/or medium, e.g., an MMS message, etc.

A call to action is a means by which the recipient of that content piece can respond to indicate her interest in the piece, e.g., vis-a-vis purchase, obtaining more information, "liking" or other commenting, and so forth. Typically, such a call to action is a button or a link (e.g., labeled "buy now," "reserve yours today," "tell me more," etc.) contained in the same email message as the content piece and, indeed, may be embedded in the piece itself (e.g., as in the case of a link embedded in a content image). A call to action can, instead or in addition, be a reply-to email address that the user can effectuate by replying to the email using menu or other options in an email client; a word, phrase or code that the user can type upon visiting a specified web site, and so forth; all, by way of non-limiting example.

Although the content piece and call to action may be contained, for example, in an email message, the response effected by the recipient (e.g., by clicking the call to action) need not be an email. For example, a recipient's action vis-a-vis a call to action may result in opening a web browser (e.g., effected via a hidden or obscure code traceable to that email message and/or the recipient thereof).

In the illustrated embodiment, a content piece may have one or more of the following features, preferably, 5 or more of those features, still more preferably, 10 or more of those features and, yet still more preferably, 15 or more of those features:

- Category
- Brand
- Newness indicator
- Gender indicator
- Special indicators (e.g. Halloween, Easter, Anniversary)
- Keywords in product description (e.g., cashmere, BOGO—Buy One Get One)
- Price range
- Deal range
- All-Black-image indicator
- All-White-image indicator
- Modeled/Unmodeled indicator (if the image is of a model wearing the product or just the product itself)
- Primary color of product image
- Resolution of product image
- Presence of caption under product image
- Number of lines of caption text
- Indicator if price/discount is mentioned in caption
- Indicator if adjacent product is from the same category
- Indicator if adjacent product is 10
- Total number of products featured in the email
- Indicator if product image is visible above the fold for a desktop/laptop screen
- Indicator if product image is visible above the fold for a tablet screen
- Indicator if product image is visible above the fold for a smartphone screen In the illustrated embodiment, each news-article oriented content piece may have one or more of the following features, preferably, 3 or more of those features, still more preferably, 6 or more of those features and, yet still more preferably, 9 or more of those features:

- Number of words in headline
- Color of font used in headline
- Number of lines of caption text
- Indicator if there is accompanying image
- Indicator if accompanying image is black-and-white
- Size of accompanying image
- Total number of news article headlines featured in the email
- Indicator if content is visible above the fold for a desktop/laptop screen
- Indicator if content is visible above the fold for a tablet screen
- Indicator if content is visible above the fold for a smartphone screen
- Actual text of news article headline In the illustrated embodiment, each user-product combination content piece may have one or more of the following features, preferably, 3 or more of those features, still more preferably, 6 or more of those features and, yet still more preferably, 9 or more of those features:

Category previously purchased indicator
Category recency (if purchased)
Brand previously purchased indicator
Brand recency (if purchased)
Product in ecommerce shopping cart indicator
Category in ecommerce shopping cart indicator
Brand in ecommerce shopping cart indicator
Product browsed in past 7 days indicator
Category browsed in past 7 days indicator
Brand browsed in past 7 days indicator
Product clicked-through-in-email indicator
Category clicked-through-in-email indicator
Brand clicked-through-in-email indicator
Bought in that price range before indicator
Category previously purchased ONLINE indicator
Product complements customer's previous buy indicator (e.g., Shirt and Tie)
Affinity score for that user-product combination (this is optional and can come from external sources, if available)

In the illustrated embodiment, each user-news-article-headline combination content piece may have one or more of the following features, preferably, 3 or more of those features, still more preferably, 6 or more of those features and, yet still more preferably, 9 or more of those features:

Indicator for whether the user has previously read articles in the topics pertaining to the news article headline
Indicator for whether the user has previously clicked-through-in-email article headlines pertaining to the topics referenced by the news article headline
Number of days since previous read of any topic
Number of days since previous read of relevant topics
Number of articles read in past 7 days
Number of articles read in past 30 days
Number of relevant articles read in past 7 days
Number of relevant articles read in past 30 days
Number of article headlines clicked-through-in-email in past 7 days
Number of article headlines clicked-through-in-email in past 30 days Server Operation Illustrated digital data device 12 and, more particularly, application 30, generates personalized click-through models for emails so as to maximize click-through rates, e.g., on email campaigns that can also be generated by that application. Referring to FIG. 2, the application 30 executes a three step process to build and deploy personalized click-through models for emails. It executes a fourth phase to generate and transmit emails based on that model.

Data collection phase: Run email campaigns over a defined time period; include (randomly chosen) content pieces in emails. Collect data on which recipients open and click on what content pieces. Alternatively, or in addition, such data can be discerned from prior email campaigns. See, Step 40.

Feature engineering phase: Extract predictive variables (aka features) on email recipients, the various aspects of the content pieces, and their interactions thereof. See, Step 42.

Model development phase: Using the data collected, create and calibrate click-prediction models. See, Step 44.

Email campaign phase: Using model created/calibrated in the model development phase, generate and transmit to customers digital content pieces that maximize the likelihood of customer response. See step 45.

Data Collection Phase

As noted earlier, the way users interact with emails can be uniquely different from the way they interact with websites, stores, newspapers etc. To be able to model a users click behavior when she is viewing an email, the application 30 collects data on users actual interactions with emails. Past user data (purchases, users interactions with the website etc) are necessary but not sufficient to build an accurate model.

In this phase, the application 30, e.g., under control of a marketing campaign manager or otherwise, compiles or otherwise obtains a history of actual responses to calls to action contained in digital content pieces sent to a first set of customers, potential customers or other recipients representative of same (collectively, "customers" or "recipients"). This can be done by randomly or otherwise sampling records from prior email campaigns, e.g., to identify emails transmitting a sufficiently wide sampling of content pieces and associated calls to action to customers and to identify the customer responses thereto. More typically, however, this is done by effecting a "data collection" email campaign using application 30 to generate such emails and to track recipient responses.

Referring to FIG. 1A, the transmission of such content pieces from server 12 to the client digital data devices 16-20 of a first set of customers is graphically depicted by emails icons 46. The customer responses are graphically depicted by arrows 48. X's on those arrows indicate responses not made—i.e., calls to action to which a customer did not respond. Thus, for example, though three content pieces 46 (each, for sake of simplicity, comprising a separate email message) and their associated calls to action are shown as having been transmitted to client device 16, the customer who received those pieces on that device only responded to calls to action in only two of them. Conversely, though the drawing shows no responses to calls to action contained in the four digital content pieces 46 transmitted to device 20, and only one response to calls to action contained associated with the two content pieces 46 transmitted to device 18.

Client Operation

Application 32 of the client digital data devices comprises email clients or other functionality that enable the respective users of those devices to view digital content pieces received by the respective devices and, if desired, to respond to calls to action associated therewith.

Feature Engineering Phase

In this phase, the application 30 extracts a dataset from the history of emails and customer responses developed in the data collection phase. To that end, for each of the N content pieces viewed by its respective recipient (e.g., as evidenced by opening of the email message in which it was contained), the application 30 discerns an enumeration of the M digital content piece/recipient feature combinations (where those features are comprise one or more of the features described in the section "Content Pieces, Features and Calls to Action," above). This can be done by parsing the digital content piece and/or by obtaining information about the piece and/or the recipient to which it was sent from a database or other records, e.g., in storage associated with device 30 or otherwise. The application 30 captures those per-piece features in an array or other data structure that can be expressed, for example, as follows:

$$\text{dataset} = \begin{bmatrix} x_{1,1} & \cdots & x_{1,M} \\ \vdots & \ddots & \vdots \\ x_{N,1} & \cdots & x_{N,M} \end{bmatrix}$$

where $x_{i,j}$ for i=1 ... N and j=1 ... M, are values for each of the respective M digital content piece/recipient features for the respective digital content pieces N Model Development Phase At the end of the feature engineering phase, the application 30 has collected and identified the features in the history of digital content pieces and resultant customer responses, as discussed above.

In the model development phase, the application 30, first, defines a target variable, $y_i$, for each content piece. Specifically, for every customer/content-piece/email combination, if the customer opened the email but did not click on the content piece, the application 30 sets the target variable, $y_i$, for that content piece to zero. If the user clicked on the content piece, the application 30 sets the target variable, $y_i$, to one.

The application 30, then, determines values of coefficients $b_0 \ldots b_M$ that maximize a probability, $P(b_1, b_2, \ldots, b_M, x_1, x_2, \ldots, x_M)$, that a recipient will respond to a call to action in an content piece having the features, $x_0 \ldots x_M$, where that probability is defined by the relation $$P(b_1, b_2, \ldots, b_M, x_1, x_2, \ldots, x_M) = \exp(\Sigma_{j=1,\ldots,M} b_j x_j) / (1 + \exp(\Sigma_{j=1,\ldots,M} b_j x_j))$$

where, $x_1, x_2, \ldots, x_M$ are values for each of the respective M features characterizing the digital content piece and/or recipient thereof, $b_1, b_2, \ldots, b_M$ are respective coefficients for each of the values $x_1, x_2, \ldots, x_M$ The application 30 of the illustrated embodiment does this by valuing those coefficients $b_1, b_2, \ldots, b_M$ so as to maximize a likelihood, $L(b_1, b_2, \ldots, b_M, \text{data})$, that predicted responses to calls to action for digital content pieces represented in the dataset match the actual responses represented in the dataset developed from the first set of recipients, where that likelihood is expressed as a function of the relation:

$$L(b_1, b_2, \ldots, b_M, \text{data}) = \Pi_{i=1,\ldots,N; y_i=1} P(b_1, b_2, \ldots, b_M, x_{i1}, x_{i2}, \ldots, x_{iM}) \cdot \Pi_{i=1,\ldots,N; y_i=0} (1 - P(b_1, b_2, \ldots, b_M, x_{i1}, x_{i2}, \ldots, x_{iM}))$$

where $\Pi_{i=1,\ldots,N; y_i=1} P(b_1, b_2, \ldots, b_M, x_{i1}, x_{i2}, \ldots, x_{iM})$ represents a product of probabilities, $P(b_1, b_2, \ldots, b_M, x_1, x_2, \ldots, x_M)$, for digital content pieces having features of those digital content pieces that were (i) previously transmitted to digital data devices of the plurality of respective recipients of the first set, and (ii) that were opened (or otherwise accessed) by there respective recipients, and (iii) to which the respective call to action was responded to by that recipient.

$\Pi_{i=1,\ldots,N; y_i=0} (1 - P(b_1, b_2, \ldots, b_M, x_{i1}, x_{i2}, \ldots, x_{iM}))$ represents a product of probabilities, $P(b_1, b_2, \ldots, b_M, x_1, x_2, \ldots, x_M)$, for digital content pieces having features of those that were (i) previously transmitted to digital data devices of the plurality of respective recipients of the first set, and (ii) that were opened (or otherwise accessed) by there respective recipients, and (iii) to which the respective call to action was not responded to by that recipient.

The foregoing is more preferably accomplished by valuing the coefficients $b_1, b_2, \ldots, b_M$ to maximize a log of the likelihood, $L(b_1, b_2, \ldots, b_M, \text{data})$, e.g., by executing a Stochastic Gradient Descent algorithm characterized by the iterative expression:

$$b_j^{t+1} = b_j^t - \eta(y_t - P(b_1^t, b_2^t, \ldots, b_N^t, x_{t1}, x_{t2}, \ldots, x_{tM})) x_{t,j}$$

where, $\eta$ is learning rate set by trial and error, $P(b_1^t, b_2^t, \ldots, b_N^t, x_{t1}, x_{t2}, \ldots, x_{tM})$ is the probability, $P(b_1, b_2, \ldots, b_M, x_1, x_2, \ldots, x_M)$, evaluated using the coefficients $b_j$, for j=1 ... M A more complete understanding of the foregoing may be attained by the following discussion in a narrative from the inventors' perspectives.

For a given email recipient, let us define the dependent (target) variable as y which is equal to 0 for opened but not clicked emails, and is equal to 1 for opened and clicked emails. Let's also define the independent variables (aka predictors, features) as a vector $x_j$ where j corresponds to index of a given independent variable and can vary from 1 to M, where M is number of independent variables.

We formulate the probability for a given email recipient clicking on the links in a given email as:

$$P(b_1, b_2, \ldots, b_M, x_1, x_2, \ldots, x_M) = \exp(\Sigma_{j=1,\ldots,M} b_j x_j) / (1 + \exp(\Sigma_{j=1,\ldots,M} b_j x_j))$$

where $b_j$ is the model coefficient that corresponds to the independent variable $x_j$ If we have a dataset that corresponds to opened/clicked emails for a set of email recipients i=1, ... N, the solution to this problem is the set of parameters $b_1, \ldots, b_M$ that maximizes the likelihood of the observed data, which is expressed as the product of the predicted probabilities of the N individual observations:

$$L(b_1, b_2, \ldots, b_M, \text{data}) = \Pi_{i=1,\ldots,N; y_i=1} P(b_1, b_2, \ldots, b_M, x_{i1}, x_{i2}, \ldots, x_{iM}) \cdot \Pi_{i=1,\ldots,N; y_i=0} (1 - P(b_1, b_2, \ldots, b_M, x_{i1}, x_{i2}, \ldots, x_{iM}))$$

where the first product corresponds to the observations where emails were opened and clicked, and the second sum corresponds to the observations where emails were opened but not clicked.

For convenience, logarithm of the likelihood function is used instead which allows to express the log-likelihood as a sum instead of products:

$$LL(b_1, b_2, \ldots, b_M, \text{data}) = \Sigma_{i=1,\ldots,N} y_i \log(P(b_1, b_2, \ldots, b_M, x_{i1}, x_{i2}, \ldots, x_{iM})) + (1 - y_i) \log(1 - P(b_1, b_2, \ldots, b_M, x_{i1}, x_{i2}, \ldots, x_{iM})) = \Sigma_{i=1,\ldots,N} (y_i \Sigma_{j=1,\ldots,M} b_j x_{i,j} - \log(1 + \exp(\Sigma_{j=1,\ldots,M} b_j x_{i,j})))$$

The set of parameters $b_1, \ldots, b_M$ that maximizes the log-likelihood function $LL(b_1, b_2, \ldots, b_M, \text{data})$ can be found by using Stochastic Gradient Descent algorithm described below.

Stochastic Gradient Descent Algorithm

Initialize coefficients $b_j^1$ to zero for $j=1, \ldots, M$,
for $t=1$ to N do $$b_j^{t+1} = b_j^t - \eta \frac{\partial LL(b_1, b_2, \ldots, b_M, \text{data})}{\partial b_j} =$$

$$b_j^t - \eta(y_t - P(b_1^t, b_2^t, \ldots, b_N^t, x_{t1}, x_{t2}, \ldots, x_{tM}))x_{t,j},$$

for $j=1, \ldots, M$
where
$\eta$ is learning rate set by trial and error, $$\frac{\partial LL(b_1, b_2, \ldots, b_M, \text{data})}{\partial b_j} =$$

derivative of the log-likelihood function with respect to $b_j$.

Email Campaign Phase

The resulting set of parameters $b_j^{N+1}$ ($j=1, \ldots, M$) are then used to calculate click probabilities, that is, probabilities that customers will respond to calls to action associated with digital content pieces in emails. Specifically, referring to FIG. 2, in an email campaign phase, the application 30 generates, for each of one or more customers in a second set of customers, digital content pieces having features that maximize a probability, $P(b_1, b_2, \ldots, b_M, x_1, x_2, \ldots, x_M)$, that the customer will respond to a call to action associated with that piece.

Because not all of the features, M, characterize the content piece and, rather, because at least one (or, more preferably, some) of them characterize aspect of the customer to whom the content piece is directed, generation of digital content pieces in this manner results in pieces that differ from one another—and, more specifically, where the digital content pieces generated and transmitted to at least two of the recipients differ from one another.

Under control of an operator or otherwise, the application 30 effects digital transmission of those content pieces substantially concurrently (i.e., within the time period typical to that for the generation and transmission of email messages in bulk to a plurality of recipients) to the respective customers via email, with one or more content pieces per email. In some embodiments, the application generates and transmits such content pieces (e.g., emails) to over 1000 customers at a time; other embodiments, to over 10,000 customers at a time; and, in still other embodiments, to over 100,000 customers at time. The generation of content pieces yielding higher rates of responses to associated calls to action is made possible through utilization model-based customization, as discussed herein.

Applications 32 executing on the digital data devices 16-24 permit the respective customers to view those emails/content pieces and to respond to them, e.g., by clicking on or otherwise taking action with respect to the pieces' associated calls to action.

Referring to FIG. 1B, the transmission of such emails from server 12 to the client digital data devices 16-20 as part of such a campaign is graphically depicted by emails icons 46. The customer responses are graphically depicted by arrows 48. Unlike during the data collection phase depicted in FIG. 1A, no X's are shown on the arrows of FIG. 1B, suggesting that due to maximization of the probabilities discussed above, the recipients in the second set respond to all of the calls to action associated with digital content pieces generated utilizing the model and model coefficients discussed above. In actual practice, this may not the case, though, such maximization is intended to increase the rate of user response over systems that do not employ the teachings hereof.

As those skilled in the art will appreciate in comparing FIGS. 1A and 1B, the recipients of digital content pieces (e.g., emails) in the data collection phase need not correspond to those of the email campaign phase. One can represent a subset of the other, as in the illustrated embodiment. And, in other embodiments, there may be no overlap between the respective sets of recipients or only partial overlap.

In view of the foregoing, what is claimed is:

1. Digital data processing methods of generating digital content pieces that are customized in accord with individual recipient behaviors, comprising:
   (A) a data collection step comprising collecting a history of responses to calls to action in emails sent to a plurality of recipients in one or more prior email campaigns, the data collection step including identifying in that history which of those recipients (i) opened emails transmitted to them in the one or more prior email campaigns and (ii) interacted with those emails,
   (B) a feature engineering step comprising
      (i) identifying from the history of responses collected in step (A) characteristics of
         the recipients that opened those emails,
         emails in the one or more prior email campaigns opened by the respective recipients, and
         the calls to action that the recipients responded to within those opened emails,
      (ii) generating a dataset reflective of those characteristics,
   (C) a model development step that generates from at least the dataset a model that predicts recipient interaction with calls to action contained in emails as a function of the said characteristics,
   (D) an email campaign-generating step that uses the model to generate and digitally transmit to digital data processing devices of each of a plurality of recipients a digital content piece that is customized to that recipient, where that digital content piece
      (i) has a call to action to which the respective recipient can respond and
      (ii) has a plurality of features selected so as to maximize a probability, $P(b_1, b_2, \ldots, b_M, x_1, x_2, \ldots, x_M)$, that the recipient will respond to that call to action, where that probability is defined by the relation $$P(b_1, b_2, \ldots, b_M, x_1, x_2, \ldots, x_M) = \exp\left(\sum_{j=1,\ldots,M} b_j x_j\right) \Big/ \left(1 + \exp\left(\sum_{j=1,\ldots,M} b_j x_j\right)\right)$$

where
$x_1, x_2, \ldots, x_M$ are values for each of a plurality, M, of features characterizing the digital content piece and/or the recipient,
$b_1, b_2, \ldots, b_M$ are respective coefficients for each of the values $x_1, x_2, \ldots, x_M$;

wherein the step of generating and digitally transmitting the digital content piece includes generating and digitally transmitting that digital content piece substantially concurrently with a plurality of other such digital content pieces as part of an email campaign, where each such piece is generated for and transmitted to a different respective recipient and wherein at least two of the digital content pieces that are generated and transmitted substantially concurrently differ from one another, and (E) wherein the aforesaid plurality of features includes features of product imagery in the digital content piece that is being generated and transmitted to the digital data processing device of that recipient, including one or more of an all-black-image feature, an all-white-image feature, a modeled/un-modeled product feature, a primary product color feature, an image resolution feature and an above-/below-the fold image feature.

2. Digital data processing methods according to claim 1, wherein the generating and digitally transmitting step includes generating and digitally transmitting the digital content piece in an email message.

3. Digital data processing methods according to claim 1, comprising the step of valuing the coefficients $b_1, b_2, \ldots, b_M$ as a function of a dataset representing a history of actual response to calls to action in a plurality, N, of digital content pieces that have one or more of the plurality of the aforesaid features previously transmitted to digital data devices of a plurality of respective recipients.

4. Digital data processing methods according to claim 3, wherein the valuing step includes valuing the coefficients $b_1, b_2, \ldots, b_M$ so as to maximize a likelihood, $L(b_1, b_2, \ldots, b_M, \text{data})$, that predicted responses to calls to action for digital content pieces represented in the dataset match the actual responses represented in the dataset.

5. Digital data processing methods according to claim 4, wherein the likelihood is expressed as a function of the relation $$L(b_1, b_2, \ldots, b_M, \text{data}) = \prod_{i=1,\ldots N; y_i=1} P(b_1, b_2, \ldots, b_M, x_{i1}, x_{i2}, \ldots, x_{iM}) \cdot \prod_{i=1,\ldots N; y_i=0} (1 - P(b_1, b_2, \ldots, b_M, x_{i1}, x_{i2}, \ldots, x_{iM}))$$

where $\Pi_{i=1,\ldots N; y_i=1} P(b_1, b_2, \ldots, b_M, x_{i1}, x_{i2}, \ldots, x_{iM})$ represents a product of probabilities, $P(b_1, b_2, \ldots, b_M, x_1, x_2, \ldots, x_M)$, for digital content pieces having features of those digital content pieces that were (i) previously transmitted to digital data devices of the plurality of respective recipients, and (ii) that were opened (or otherwise accessed) by their respective recipients, and (iii) to which the respective call to action was responded to by that recipient;

$\Pi_{i=1,\ldots N; y_i=0}(1 - P(b_1, b_2, \ldots, b_M, x_{i1}, x_{i2}, \ldots, x_{iM}))$ represents a product of probabilities, $P(b_1, b_2, \ldots, b_M, x_1, x_2, \ldots, x_M)$, for digital content pieces having features of those that were (i) previously transmitted to digital data devices of the plurality of respective recipients, and (ii) that were opened (or otherwise accessed) by their respective recipients, and (iii) to which the respective call to action was not responded to by that recipient.

6. Digital data processing methods of claim 5, wherein the valuing step includes valuing the coefficients, $b_1, b_2, \ldots, b_M$ to maximize a log of the aforesaid likelihood, $L(b_1, b_2, \ldots, b_M, \text{data})$.

7. Digital data processing methods of claim 6, wherein the valuing step includes valuing the coefficients, $b_1, b_2, \ldots, b_M$, by executing a Stochastic Gradient Descent algorithm; In related aspects of the invention, that is characterized by the iterative expression $$b_j^{t+1} = b_j^t - \eta(y_t - P(b_1^t, b_2^t, \ldots, b_N^t, x_{t1}, x_{t2}, \ldots, x_{tM}))x_{t,j}$$

where, $\eta$ is learning rate set by trial and error, $P(b_1^t, b_2^t, \ldots, b_N^t, x_{t1}, x_{t2}, \ldots, x_{tM})$ is the probability, $P(b_1, b_2, \ldots, b_M, x_1, x_2, \ldots, x_M)$, evaluated using the coefficients $b_j$, for $j=1 \ldots M$.

8. Digital data processing methods of claim 1, wherein the step of generating and transmitting includes generating and transmitting such digital data content pieces substantially concurrently to a first set of over 100 recipients.

9. Digital data processing methods of claim 1, wherein the step of generating and transmitting includes generating and transmitting such digital data content pieces substantially concurrently to a first set of over 1,000 recipients.

10. Digital data processing methods of claim 1, wherein the step of generating and transmitting includes generating and transmitting such digital data content pieces substantially concurrently to a first set of over 10,000 recipients.

11. Digital data processing methods of claim 1, wherein the step of generating and transmitting includes generating and transmitting such digital data content pieces substantially concurrently to a first set of over 100,000 recipients.

12. Digital data processing methods of claim 8, wherein the step of valuing includes valuing the coefficients $b_1, b_2, \ldots, b_M$ as a function of a dataset representing a history of actual response to calls to action in a plurality, N, of digital content pieces that have one or more of the plurality of the aforesaid features previously transmitted to digital data devices of a plurality of second set of respective recipients.

13. Digital data processing methods of claim 12, wherein the first set and second sets overlap one another.

14. Digital data processing methods of claim 12, wherein the first set and second sets do not overlap one another.

* * * * *